United States Patent Office 3,208,939
Patented Sept. 28, 1965

3,208,939
STABILIZATION OF ORGANIC SUBSTANCES
Edwin J. Latos, Chicago, and Charles M. Hayes, Hoffman Estates, Ill., assignors to Universal Oil Products Company, Des Plaines, Ill., a corporation of Delaware
No Drawing. Filed Dec. 12, 1963, Ser. No. 329,951
14 Claims. (Cl. 252—34)

This invention relates to the stabilization of organic substances and more particularly to the use of a novel additive for this purpose.

While the present invention may be used for the stabilization of gasoline, naphtha, etc., it is especially useful in the stabilization of oils heavier than gasoline including kerosene, jet fuel, lubricating oil, diesel oil, fuel oil, residual oil, etc., as well as drying oils, grease, resins, waxes, polymers and particularly polyolefins, rubber, etc.

In one embodiment the present invention relates to a method of stabilizing an organic substance which comprises incorporating therein a stabilizing concentration of the reaction product of a polyhalopolyhydroalkanonaphthalenedicarboxylic acid and derivatives thereof with an amine.

In another embodiment the present invention comprises an organic substance and particularly an oil heavier than gasoline containing a stabilizing concentration of the additive set forth herein.

As hereinbefore set forth, the novel additive of the present invention is prepared by the reaction of a particular type of dicarboxylic acid or derivative thereof with an amine. The particular type of acid is a polyhalopolyhydroalkanonaphthalenedicarboxylic acid. A particularly preferred acid or anyhdride thereof is prepared by the Diels-Alder condensation of a conjugated aliphatic diene with an olefinic dicarboxylic acid and then further condensing the resultant cyclohexenedicarboxylic acid with a halocycloalkadiene. A particularly preferred reaction product is the Diels-Alder condensation of 1,3-butadiene with maleic acid to form 1,2,3,6-tetrahydrophthalic acid, followed by the Diels-Alder condensation with hexachlorocyclopentadiene. The resultant product may be named 5,6,7,8,9,9-hexachloro-1,2,3,4,4a,5,8,8a-octahydro-5,8-methano-2,3-naphthalenedicarboxylic acid, hereinafter referred to as "A" acid. The corresponding anhydride is prepared starting with maleic anhydride instead of maleic acid. The anhydride may be named 5,6,7,8,9,9-hexachloro-1,2,3,4,4a,5,8,8a-octahydro - 5,8 - methano-2,3-naphthalenedicarboxylic anhydride, hereinafter referred to as "A" anhydride. Other conjugated aliphatic dienes may be used including for example, 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated octadienes, conjugated nonadienes, etc., halodienes as, for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, 1,2-dichlorocyclopentadiene, 1,5-dichlorocyclopentadiene, 1,2,3 - trichlorocyclopentadiene, 1,2,3,4-tetrachlorocyclopentadiene, 1,2,3,4,5-pentachlorocyclopentadiene and similar compounds in which all or part of the chlorine is replaced by another halogen and particularly bromine. The preparation of these compounds is known in the art and is set forth in detail in U.S. Patent 3,017,431.

Still another preferred polyhalopolyhydroalkanonaphthalenedicarboxylic acid or anhydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro - 1,2,3,4,4a,5,8,8a - octahydro-1,4,5,8-dimethano-2,3-naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydroalkanonaphthalenedicarboxylic acids or anhydrides.

From the above, it will be seen that any suitable polyhalopolyhydroalkanonaphthalenedicarboxylic acid or anhydride may be used in accordance with the present invention. The polyhalopolyhydroalkanonapthalenedicarboxylic acid may be illustrated by the following general structure:

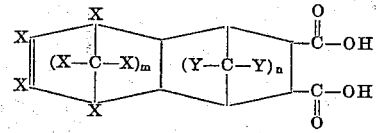

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four and $n$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one and $n$ is zero, the compound is 5,6,7,8,9,9-hexachloro-1,2,3,4,4a,5,8,8a-octahydro-5,8-methano - 2,3-naphthalenedicarboxylic acid or the corresponding anhydride. Also, when X is chlorine, Y is hydrogen, $m$ is one and $n$ is one, the compound is 5,6,7,8,9,9-hexachloro-1,2,3,4,4a,5,8,8a-octahydro-1,4,5,8-dimethano-2,3 - naphthalenedicarboxylic acid or the corresponding anhydride.

In general, it is preferred that the particular acid or anhydride be used. However, in another embodiment, an ester of the acid may be used for reacting with the amine. Any suitable ester may be used and is readily prepared by reacting the acid with an alcohol under conditions to liberate water. The alcohol may contain from one to twenty-five or more carbon atoms and preferably contains from two to eight carbon atoms. Illustrative alcohols include methanol, ethanol, propanol, butanol, pentanol, hexanol, heptanol, octanol, etc. The ester is readily prepared by refluxing from one to two mole proportions of the alcohol with one mole proportion of the dicarboxylic acid, preferably with the concomitant removal of the water formed in the reaction.

As hereinbefore set forth, the acid, anhydride or other derivative described above is reacted with an amine. Any suitable amine may be used and contains from two to fifty carbon atoms or more and preferably from eight to twenty carbon atoms. The amine may be a monoamine or polyamine. Preferably monoamines include octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, etc. The amines may be prepared from fatty acid derivatives and, thus, may comprise tallow amine, hydrogenated tallow amine, lauryl amine, stearyl amine, oleyl amine, linoleyl amine, coconut amine, soya mine, etc.

Of the polyamines, N-alkyl diaminoalkanes are preferred. A particularly preferred amine of this class comprises an N-alkyl-1,3-diaminopropane in which the alkyl group contains from about eight to about twenty-five carbon atoms. A number of N-alkyl diaminoalkanes of this class are available commercially, such as "Duomeen T" and "Diam 26" in which the alkyl group is derived from tallow and contains from about twelve to about twenty carbon atoms per group and mostly sixteen to eighteen carbon atoms. Other N-alkyl-1,3-diaminopropanes may be prepared to contain any number of carbon atoms desired in the alkyl group and thus the alkyl group is selected from hexyl, heptyl, octyl, nonyl, decyl, undecyl, dodecyl, tridecyl, tetradecyl, pentadecyl, hexadecyl, heptadecyl, octadecyl, nonadecyl, eicosyl, etc.

While the N-alkyl-1,3-diaminopropanes are preferred, it is understood that other suitable N-alkyl diaminoalkanes may be employed. Illustrative examples include N-alkyl-1,2-diaminoethane, N-alkyl-1,2-diaminopropane, N-alkyl-1,2-diaminobutane, N-alkyl-1,3-diaminobutane, N-alkyl-1,4-diaminobutane, N-alkyl-1,2-diaminopentane, N-alkyl-1,3-diaminopentane, N-alkyl-1,4-diaminopentane, N-alkyl-1,5-diaminopentane, N-alkyl-1,2-diaminohexane, N-alkyl-1,3-diaminohexane, N-alkyl-1,4-diaminohexane, N-alkyl-1,5-diaminohexane, N-alkyl-1,6-diaminohexane, etc. Other polyamines include ethylenediamine, propylenediamine, butylenediamine, pentylenediamine, hexylenediamine, heptylenediamine, octylenediamine, etc., diethylenetriamine, dipropylenetriamine, dibutylenetriamine, dipentylenetriamine, dihexylenetriamine, diheptylenetriamine, dioctylenetriamine, etc., triethylenetetraamine, tripropylenetetraamine, tributylenetetraamine, tripentylenetetraamine, trihexylenetetraamine, triheptylenetetraamine, trioctylenetetraamine, etc., tetraethylenepentaamine, tetrapropylenepentaamine, tetrabutylenepentaamine, tetrahexylenepentaamine, tetraheptylenepentaamine, tetraoctylenepentaamine, etc., pentaethylenehexaamine, pentapropylenehexaamine, pentabutylenehexaamine, pentapentylenehexaamine, pentahexylenehexaamine, pentaheptylenehexaamine, pentaoctylenehexaamine, etc., and particularly these polyamines in which one or more of the nitrogen atoms is substituted with an alkyl group of from one to twenty or more carbon atoms.

In another embodiment the amine is an aromatic amine. Aromatic monoamines include aniline, toluidines, xylidines, etc., naphthylamine, anthracylamine, rosin amine, etc., as well as the N-mono- and N,N-di-alkylated aromatic amines in which the alkyl group or groups contain from one to twenty carbon atoms or more. Illustrative examples of such compounds include N-methylaniline, N,N-di-methylaniline, N-ethylaniline, N,N-di-ethylaniline, N-propylaniline, N,N-di-propylaniline, N-butylaniline, N,N-di-butylaniline, N-amylaniline, N,N-di-amylaniline, N-hexylaniline, N,N-di-hexylaniline, N-heptylaniline, N,N-di-heptylaniline, N-octylaniline, N,N-di-octylaniline, N-nonylaniline, N,N-di-nonylaniline, N-decylaniline, N,N-di-decylaniline, N-undecylaniline, N,N-di-undecylaniline, N-dodecylaniline, N,N-di-dodecylaniline, etc., as well as the corresponding substituted toluidines, xylidines, naphthylamines, anthracylamines, etc.

In still another embodiment the amine may contain halogen as, for example, in compounds such as chloroaniline, 2,3-dichloroaniline, 2,4-dichloroaniline, 2,5-dichloroaniline, 2,6-dichloroaniline, 3,4-dichloroaniline, 3,5-dichloroaniline, bromoaniline, 2,3-dibromoaniline, 2,4-dibromoaniline, 2,5-dibromoaniline, 2,6-dibromoaniline, 3,4-dibromoaniline, 3,5-dibromoaniline, etc.

In another embodiment the aromatic amine is a diarylamine including, for example, diphenylamine, aminodiphenylamine, diaminodiphenylamine, dinaphthylamine, aminodinaphthylamine, diaminodinaphthylamine, etc. In the polyamino aromatic compounds, the nitrogen atoms may be in the position ortho, meta or para to each other. The amino or diaminodiphenylamines may contain alkyl groups attached to one or both nitrogen atoms and the alkyl groups may contain from one to twenty or more carbon atoms each. Illustrative compounds include p,p'-di-methylaminodiphenylamine,
p,p'-di-ethylaminodiphenylamine,
p,p'-di-propylaminodiphenylamine,
p,p'-di-butylaminodiphenylamine,
p,p'-di-amylaminodiphenylamine,
p,p'-di-hexylaminodiphenylamine,
p,p'-di-heptylaminodiphenylamine,
p,p'-di-octylaminodiphenylamine,
p,p'-di-nonylaminodiphenylamine,
p,p'-di-decylaminodiphenylamine, etc.,
o,p'-di-methylaminodiphenylamine,
o,p'-di-ethylaminodiphenylamine,
o,p'-di-propylaminodiphenylamine,
o,p'-di-butylaminodiphenylamine,
o,p'-di-amylaminodiphenylamine,
o,p'-di-hexylaminodiphenylamine,
o,p'-di-heptylaminodiphenylamine,
o,p'-di-octylaminodiphenylamine,
o,p'-di-nonylaminodiphenylamine,
o,p'-di-decylaminodiphenylamine, etc.,
N-alkyldiaminodiphenylamine,
N,N,N'-trialkyldiaminodiphenylamine,
N,N,N',N'-tetraalkyldiaminodiphenylamine, etc.

In still another embodiment the amine comprises such compounds as aminodiphenyl ether, N-alkylaminodiphenyl ether,
N,N'-dialkylaminodiphenyl ether,
N,N,N'-trialkylaminodiphenyl ether,
N,N,N',N'-tetraalkylaminodiphenyl ether,
aminodiphenyl sulfide,
N-alkylaminodiphenyl sulfide,
N,N'-dialkylaminodiphenyl sulfide,
N,N,N'-trialkylaminodiphenyl sulfide,
N,N,N',N'-tetraalkylaminodiphenyl sulfide,
aminodiphenylmethane,
N-alkylaminodiphenylmethane,
N,N'-dialkylaminodiphenylmethane,
N,N,N'-trialkylaminodiphenylmethane,
N,N,N',N'-tetraalkylaminodiphenylmethane,
aminodiphenylethane,
N-alkylaminodiphenylethane,
N,N'-dialkylaminodiphenylethane,
N,N,N'-trialkylaminodiphenylethane,
N,N,N',N'-tetraalkylaminodiphenylethane,
aminodiphenylpropane,
N-alkylaminodiphenylpropane,
N,N'-dialkylaminodiphenylpropane,
N,N,N'-trialkylaminodiphenylpropane,
N,N,N',N'-tetraalkylaminodiphenylpropane,
aminodiphenylbutane,
N-alkylaminodiphenylbutane,
N,N'-dialkylaminodiphenylbutane,
N,N,N'-trialkylaminodiphenylbutane,
N,N,N',N'-tetraalkylaminodiphenylbutane, etc., in which the alkyl group or groups contain from one to twenty or more carbon atoms each.

In another embodiment the amine comprises a cycloalkyl amine which may be a monoamine or polyamine. Monoamines includes cyclobutyl amine, cyclopentyl amine, cyclohexyl amine, cycloheptyl amine, cyclooctyl amine, etc., and these amines containing one or more alkyl substituents attached to the nucleus, the alkyl substituents containing from one to about twenty carbon atoms each. Polyamines include cyclobutyl diamine, cyclopentyl diamine, cyclohexyl diamine, cycloheptyl diamine, cyclooctyl diamine, etc., dicycloalkyl triamines, tricycloalkyl tetraamines, tetracycloalkyl pentaamines, etc., and these polyamines in which one or more of the nitrogen atoms and/or the nucleus is substituted by an alkyl group containing from one to about twenty carbon atoms each. In general, the cyclohexyl amine and cyclohexyl diamine are preferred.

In still another embodiment the amine may contain other substituents and particularly sulfur. The additional sulfur in the amine and, accordingly, in the final product may be of advantage when the product is used as an additive in lubricating oil or other substrate in which additional sulfur is desired. In one embodiment the sulfur-containing amine is prepared by reacting carbon disulfide with the amine, and particularly with an N-alkylated or N,N'-dialkylated alkylene polyamine. Particularly preferred substituted amines in this embodiment include the product formed by reacting carbon disulfide with N,N'-dialkyl-ethylenediamine or with $N^1,N^3$-dialkyl-diethylenetriamine. The reaction is effected by dissolving the amine in a suitable solvent such as benzene, toluene, etc., pentane, hexane, heptane, etc., cooling the solution to about 50° F. or lower and gradually adding an equal mole ratio of carbon disulfide dissolved in a suitable solvent and preferably the same solvent as used to dissolve the amine. The reaction is highly exothermic and the temperature is controlled by cooling in an ice bath or otherwise. In most cases the reaction mixture solidifies, apparently forming an inert salt. The reaction mixture is heated to a temperature of from about 300° to about 350° F. to remove the solvent and to eliminate hydrogen sulfide, resulting in the formation of the corresponding imidazolidinethione. The product is recovered as an amber clear liquid. It is understood that other sulfur-containing amines which react with the oxylakylenated hydroxyhydrocarbon thiophosphate may be used in accordance with the present invention.

It is understood that a mixture of amines may be employed and that the different amines are not necessarily equivalent, but all of them will serve to produce effective additives.

The reaction of the acid, anhydride or other derivative with the amine is effected in any suitable manner. The specific conditions for reacting the acid or anhydride and amine will depend upon whether the reaction product is to be a salt or neutralization product formed under conditions which avoid the liberation of water or whether the reaction product is to be formed with the liberation of water. When the reaction product is to be a salt, the amine may comprise primary, secondary and/or tertiary amine groups. When using a monoamine and the mono or half salt is desired, the reactants are reacted in an equal mole proportion of acid and amine or, when the double salt is desired, the reactants are reacted in a proportion of one mole of acid and two moles of monoamine. However, when desired, an excess of one of the reactants may be used. The acid is used for the prepartion of the salt. When the anhydride is to be used, it first should be hydrolyzed to form the acid for subsequent prepartion of the salt.

As hereinbefore set forth, the formation of the salt is effected under mild conditions and conveniently is effected by intimately mixing the reactants at ambient temperature (about 50° to about 100° F.), although an elevated temperature which generally will not exceed about 150° F. may be employed, particularly when the reaction is effected under superatmospheric pressure which may range from 5 to 500 pounds per square inch or more. The time of mixing will be sufficient to effect substantially complete reaction and may vary from about 0.25 to 12 hours or more. The reaction is readily effected by intimately mixing the reactants, preferably in the presence of a suitable solvent. The solvent is used to facilitate dissolving the reactants and particularly the acid and thereby forming a readily reactable solution. Either one or both of the reactants may be prepared as separate solutions in the solvent and the reactants then are intimately mixed. Any suitable solvent may be used and, in one embodiment, preferably comprises an aromatic hydrocarbon including benzene, toluene, xylene, ethylbenzene, cumene, etc., or a mixture thereof. In another embodiment the solvent comprises a paraffinic hydrocarbon including pentane, hexane, heptane, octane, nonane, decane or a mixture thereof. In another embodiment the solvent comprises an ether and particularly ethyl ether. It is understood that any suitable solvent in which the reactants are soluble and which is inert under these conditions may be employed. The solution of the salt in the solvent may be used as such or, when desired, the solvent may be removed from the salt in any suitable manner.

When the reaction of the acid or anhydride and amine is effected with the liberation of water, the reactants are reacted in a ratio of one mole proportion of acid or anhydride and from one to two mole proportions of amine. Here again, an excess of one of the reactants may be employed when desired. In order to favor the mole for mole reaction product, an excess of the amine preferably is used and this excess may range up to ten or more mole proportions of polyamine per one mole proportion of the anhydride. One or both of the reactants are conveniently prepared as a solution in a solvent, which solvent conveniently is selected from those hereinbefore specifically set forth. The reactants then are commingled and heated to refluxing conditions to cause interaction of the acid or anhydride and the amine, with the liberation of water. The refluxing temperature will depend upon the particular solvent used and generally will be within the range of from about 175° to about 500° F. When desired, the reaction is effected under superatmospheric pressure which may be within the range of from 5 to 500 pounds per square inch or more. The time of refluxing generally will range from about 0.5 to 12 hours or more. The water formed during the reaction preferably is continuously removed from the reaction zone.

In the preparation of the reaction product accompanied by the liberation of water, it is believed that the reaction product is an imide when prepared from a monoamine and an imide-amine when prepared from a polyamine. In one embodiment the additive is recovered in admixture with the solvent. However, when desired, the solvent may be removed in any suitable manner, including distillation under atmospheric or subatmospheric pressure to recover the product free of solvent.

Without intending to be limited thereto, it is believed that the preferred additive of the present invention will be of the general structures illustrated below. In the interest of simplicity, the structures shown below are limited to products prepared from a diamine, it being understood that the structures will be modified when a monoamine or a polyamine containing three or more nitrogen atoms is used in preparing the additive or when additional halogen or other substitutions are present.

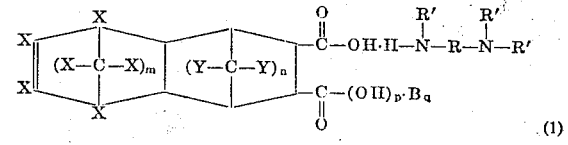

(1)

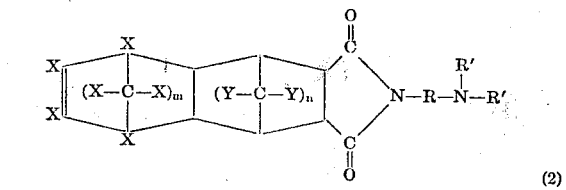

(2)

where X, Y, m and n have the same designations as hereinbefore set forth, R is selected from the group consisting of an alkylene group of from two to twenty carbon atoms, aryl group and a cycloalkyl group, R' is selected from the group consisting of hydrogen and an alkyl group of from one to thirty carbon atoms, B is selected from the group consisting of OR and amine, and p and q range from 0 to 1.

Referring to structure (1), when p is one and q is 0, the composition of matter is the mono or half salt prepared under conditions which avoid the liberation of water as hereinbefore set forth. When $p$ and $q$ are one and B is amine, the composition of matter is the double salt also prepared under conditions which avoid the liberation of water. Figure (2) illustrates the reaction product formed under conditions to liberate water and, as hereinbefore set forth, is believed to be an imide-amine.

The structures illustrated hereinbefore describe the salt or neutralization reaction product and the imide-amine structure. In another embodiment the invention comprises the amide-amine structure which is prepared by reacting, at room temperature, an anhydride described previously with a polyamine containing primary and/or secondary amino groups. It is believed that the anhydride structure is broken and one hydrogen of the amine attaches to the oxygen to form a carboxyl group and the nitrogen of the amine attaches to the other carbon atom, thereby resulting in an amide. Accordingly, when "A" anhydride or "B" anhydride is reacted at room temperature with an alkylamine, N-alkylamine, alkylene polyamine, N-alkyl-alkylenepolyamine or N,N' - dialkyl - alkylenepolyamine, these being selected from those hereinbefore specifically set forth, an amide is formed. It is understood that a mixture of products including inner salts, possibly heterocyclic ring, etc., also may be formed. As a specific example, "A" anhydride is mixed at room temperature with N,N'-di-secoctyl-ethylenediamine, and the mixture is intimately stirred. In this example, the mixture is not subjected to refluxing which, when a polyamine is used, will result in the imide-amine heretofore described.

As hereinbefore set forth, applicants do not intend to be limited to the structures illustrated above. It is understood that the final product may contain a mixture of compounds including those formed by intermolecular condensation, polymerization, etc. Because the specific structure of the final products has not been definitely established, applicants are claiming the additive by the method of manufacture.

Conveniently the additive is recovered as a solution in a suitable solvent and is used in this manner as an additive to an organic substrate. However, when the product is recovered in the absence of a solvent or when the product is not sufficiently soluble in the substrate, the desired solubility may be obtained by dissolving the reaction product in a mutual solvent. Suitable solvents for this purpose comprise phenols and particularly alkylphenols of polyalkylphenols in which the alkyl group contains from six to twenty carbon atoms. The phenol may be used in a concentration of from about 5% and preferably from about 25% to about 200% by weight, and more particularly from about 30% to about 100% by weight of the reaction product of the present invention.

In one embodiment the additive of the present invention is used in lubricating oil. The lubricating oil may be of natural or synthetic origin. The mineral oils include those of petroleum origin and are referred to as motor lubicating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl)azelate, di-3,5,5 - trimethylhexyl glutarate, di - 3,5,5 - trimethylpentyl glutarate, di-(2-ethylhexyl)pimelate, di-(2-ethylhexyl)adipate, triamyl tricarballylate, pentaerythritol tetracaproate, dipropylene glycol dipelargonate, 1,5-pentane-diol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petrolum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

The additive of the present invention is used in an organic substrate in a small but stabilizing concentration.

Depending upon the particular use, the additive may be employed in a concentration of from about 0.01% to about 25% and preferably from about 0.05% to about 10% by weight of the oil. These and the following concentrations are on the basis of the active constituent and do not include the solvent or solubilizing phenol when used. When used in conventional lubricating oil, the additive generally is employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to about 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive may be used along with other additives incorporated in the oil for specific purposes. In most cases, it is desirable to also incorporate an additional antioxidant in the oil. Preferred antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, etc. Also, other additives incorporated in lubricating oil include metal deactivator, dye, viscosity index improver, pour point depressor, anti-foaming additive, detergent, etc.

The following examples are introduced to illustrate further the novelty and utility of the present invention but not with the intention of unduly limiting the same.

EXAMPLE I

The additive of this example was prepared by the reaction of "A" anhydride (5,6,7,8,9,9-hexachloro-1,2,3,4,4a,5,8,8a - octahydro - 5,8 - methano - 2,3 - naphthalenedicarboxylic anhydride) with diethylenetriamine. The reaction was effected by gradually adding 213 g. (0.5 mole) of "A" anhydride to 258 g. (2.5 moles) of diethylenetriamine over a one hour period. Following this, 200 ml. of benzene was added and the mixture was heated and refluxed for about 1.5 hours. Approximately 9 ml. of water was removed during the refluxing. The benzene was removed by distillation on a steam bath. Excess diethylenetriamine was removed by distillation under high vacuum. At this point, the reaction mixture was a yellow-orange brittle solid having a basic nitrogen equivalent weight of 220. The product was ground to a fine powder and washed several times with water, dissolved in methanol and dried with anhydrous sodium sulfate. This was followed by filtering and evaporation of the methanol, to leave a red viscous clear liquid which crystallized to a red solid upon standing. The product had a basic nitrogen equivalent weight of 262. This corresponds to the theoretical nitrogen equivalent of 255 for the equal mole reaction product which, as hereinbefore set forth, is believed to be an imide-amine.

EXAMPLE II

The additive of this example was prepared by mixing, at room temperature with intimate stirring, 2.13 g. of "A" acid (5,6,7,8,9,9 - hexachloro - 1,2,3,4,4a,5,8,8a-octahydro-5,8-methano - 2,3 - naphthalenedicarboxylic acid), 2.70 g. of oleyl amine and 4.83 g. of dioctyl sebacate ("Plexol 201"), thereby forming a 50% solution of active component. The mixture was warmed slightly with continued stirring in order to insure a homogeneous solution.

EXAMPLE III

The additive of this example was prepared by using an amine formed by reacting $N^1,N^3$-bis-(1-ethyl-3-methylpentyl)diethylenetriamine with carbon disulfide and then reacting the resultant amine with "A" acid. The reaction of the $N^1,N^3$-bis-diethylenetriamine with carbon disulfide was effected by dissolving 327 g. (1 mole) of the triamine in 500 cc. of xylene and slowly adding 76 g. (1 mole) of carbon disulfide thereto with vigorous stirring. The mixture then was stirred and heated to refluxing until the evolution of hydrogen sulfide ceased. After completion of the reaction the solvent was removed by vacuum distillation. The product had a neutralization equivalent of 359.7 which corresponds to the calculated neutralization equivalent of 369.7.

The amine salt was prepared by mixing, at room temperature with intimate stirring, 7.35 g. (0.02 mole) of the triamine-carbon disulfide reaction product, 4.43 g. (0.01 mole) of the "A" acid and 11.7 g. of dioctyl sebacate ("Plexol 201"), thereby forming a 50% solution of active component. The mixture was warmed slightly with continued stirring in order to insure a homogeneous solution. The additive concentrate was recovered as a straw colored viscous liquid.

EXAMPLE IV

The additive of this example is prepared by the reaction of one mole proportion of "A" acid and one-half mole proportion of "Duomeen T." As hereinbefore set forth, "Duomeen T" is N-alkyl-1,3-diaminopropane in which the alkyl group contains from twelve to twenty carbon atoms and mostly sixteen to eighteen carbon atoms. The "A" acid and "Duomeen T" are admixed at room temperature with intimate stirring. For ease in handling and reaction, the "A" acid is prepared as a solution in benzene and the "Duomeen T" is added thereto.

EXAMPLE V

The additive of this example is prepared by reacting equal mole proportions of "B" anhydride (5,6,7,8,9,9-hexachloro - 1,2,3,4,4a,5,8,8a - octahydro - 1,4,5,8 - dimethano-2,3-naphthalenedicarboxylic anhydride) and "Diam 26." As herein before set forth, "Diam 26" is substantially the same as "Duomeen T." This reaction is effected by refluxing the "B" anhydride and "Diam 26" in benzene solvent, with the concomitant removal of water formed during the reaction.

EXAMPLE VI

The additive of this example is prepared by reacting equal mole proportions of "B" anhydride and N,N'-disecoctyl-p-phenylenediamine under refluxing conditions in the presence of benzene solvent.

EXAMPLE VII

As hereinbefore set forth, in one embodiment the additive of the present invention is used in lubricating oil. One method of evaluating lubricating oils is by the Falex machine. This procedure is described in detail in a book entitled "Lubricant Testing," authorized by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for 5 minutes at 250 and 500 pound loads and then 45 minutes at 750 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for 5 minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature. The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run No. 2 is a run made using another sample of the "Plexol" to which had been added 2% by weight of the additive prepared as described in Example I.

Run No. 3 is a run made using another sample of the "Plexol" to which had been added 2% by weight of the additive prepared as described in Example II.

Run No. 4 is a run made using another sample of the "Plexol" to which had been added 2% by weight of the additive prepared as described in Example III.

*Table I*

| Run No. | Temperature, °F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 150 | 231 | 490-S | 3-4 | 9-10 | 18-S | 0 | 0 | S | 750 | 2 | 490 |
| 2 | 142 | 222 | 375 | 4-7 | 10-12 | 24-35 | 0 | 0 | 181 | 1,500 | 3.7 | 675 |
| 3 | 145 | 210 | 415 | 3-5 | 9-14 | 17-40 | 0 | 1 | 127 | 1,750 | 1.5 | 725 |
| 4 | 170 | 233 | 447 | 6-7 | 12-16 | 20-37 | 0 | 4 | 199 | 1,500 | 1.2 | 690 |

S—Seizure.

From the data in the above table, it will be seen that the dioctyl sebacate without additive (Run No. 1) underwent seizure at a load of 750 pounds. In contrast, seizure conditions for the samples of the dioctyl sebacate containing the additives of the present invention were 1500 and 1750 pounds.

EXAMPLE VIII

Another series of evaluations were made using a purified mineral oil marketed commercially as "Carnes 340 White Oil." Typical specifications of this oil include the following.

Distillation range, °F. _____ 740–975
Specific gravity at 60° F. _____ 0.8836
Viscosity:
  At 100° F. _____ 360
  At 210° F. _____ 52.2
Flash point, COC, °F. _____ 440
Pour point, °F. _____ −20
Refractive index at 68° F. _____ 1.4805
Saybolt color _____ +30

Run No. 5 in the following table is the run made using the white oil not containing an additive and thus is the blank or control run.

Run No. 6 is a run made using another sample of the white oil to which had been added 2% by weight of the additive prepared as described in Example I. The additive was not readily soluble in the white oil and accordingly was solubilized by commingling nonylphenol therewith and heating and stirring as required.

Run No. 7 is a run made using another sample of the white oil to which had been added 2% by weight of the additive prepared as described in Example II. Here again, the additive was solubilized with nonylphenol.

Run No. 8 is a run made using another sample of the white oil to which had been added 2% by weight of the additive prepared as described in Example III.

*Table II*

| Run No. | Temperature, °F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 5 | 172 | 350-S | ---- | 5-6 | 30-S | ---- | 0 | S | ---- | 425 | <0.1 | 275 |
| 6 | 178 | 337 | 600-S | 5-8 | 19-21 | 40-S | 0 | 2 | S | 1,000 | 2.5 | 700 |
| 7 | 168 | 272 | 450 | 5-6 | 12-20 | 24-S | 0 | 2 | 34S | 975 | <0.1 | 450 |
| 8 | 178 | 310 | 463 | 6-7 | 17-18 | 22-28 | 0 | 0 | 104 | 1,750 | 2.0 | 750 |

S—Seizure.

Here again, it will be seen that the oil without additive (Run No. 5) underwent seizure at a low load which, in this case, was 475 pounds. In contrast, the white oil containing the additive of the present invention did not undergo seizure until loads of 975 to 1750 pounds.

EXAMPLE IX

The additive of Example I is used in a concentration of 0.3% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D–942 method, in which method a sample of the grease is placed in a bomb and maintained at a temperature of 248° F. Oxygen is charged to the bomb, and the time required for a drop of five pounds pressure is taken as the induction period. A sample of the grease without additive will reach the induction period in about eight hours. On the other hand, a sample of the grease containing 0.3% by weight of the additive of the present invention will not reach the induction period for more than 100 hours.

We claim as our invention:

1. Lubricant comprising a major proportion of an oil of lubricating viscosity and normally subject to deterioration during storage, transportation and use containing, as an inhibitor against said deterioration, a small but stabilizing concentration of the product obtained by reacting (a) compound selected from the group consisting of polyhalopolyhydroalkanonaphthalenedicarboxylic acid and anhydride and ester thereof with (b) an amine, said product being selected from the group consisting of salt, imide, amide, imide-amine and amide-amine.

2. The composition of claim 1 wherein said polyhalopolyhydroalkanonaphthalenedicarboxylic acid is 5,6, 7,8,9,9-hexachloro-1,2,3,4,4a,5,8,8a-octahydro-5,8 - methano-2,3-naphthalenedicarboxylic acid.

3. The composition of claim 1 wherein said polyhalopolyhydroalkanonaphthalenedicarboxylic acid compound is 5,6,7,8,9,9-hexachloro-1,2,3,4,4a,5,8,8a-octahydro-5,8-methano-2,3-naphthalenedicarboxylic anhydride.

4. The composition of claim 1 wherein said polyhalopolyhydroalkanonaphthalenedicarboxylic acid is 5,6,7,8,9,9-hexachloro-1,2,3,4,4a,5,8,8a-octahydro-1,4,5,8 - dimethano-2,3-naphthalenedicarboxylic acid.

5. The composition of claim 1 wherein said polyhalopolyhydroalkanonaphthalenedicarboxylic acid compound is 5,6,7,8,9,9-hexachloro-1,2,3,4,4a,5,8,8a - octahydro-1,4,5,8-dimethano-2,3-naphthalenedicarboxylic anhydride.

6. The composition of claim 1 wherein said amine is an alkylene polyamine.

7. The composition of claim 1 wherein said amine is an N-alkyl-1,3-diaminopropane.

8. The composition of claim 1 wherein said amine is a fatty amine.

9. The composition of claim 1 wherein said amine is the reaction product of an alkylene polyamine and carbon disulfide.

10. Lubricant comprising a major proportion of an oil of lubricating viscosity containing from about 0.01% to about 25% by weight of the product obtained by reacting (a) compound selected from the group consisting of polyhalopolyhydroalkanonaphthalenedicarboxylic acid and anhydride and ester thereof with (b) amine, said product being selected from the group consisting of salt, imide, amide, imide-amine and amide-amine.

11. Lubricating oil containing from about 0.05% to about 10% by weight of the product obtained by reacting 5,6,7,8,9,9-hexachloro-1,2,3,4,4a,5,8,8a - octahydro - 5,8-methano-2,3-naphthalenedicarboxylic anhydride with an amine, said product being selected from the group consisting of salt, imide, amide, imide-amine and amide-amine.

12. The composition of claim 11 wherein said amine is an alkylene polyamine.

13. The composition of claim 11 wherein said amine is a fatty amine.

14. The composition of claim 11 wherein said amine is the reaction product of an alkylene polyamine and carbon disulfide.

References Cited by the Examiner

UNITED STATES PATENTS

| | | | |
|---|---|---|---|
| 3,017,431 | 1/62 | Schmerling | 260—514 |
| 3,088,911 | 5/63 | Staffin et al. | 252—34 X |

DANIEL E. WYMAN, *Primary Examiner.*